United States Patent [19]
Baird et al.

[11] Patent Number: 5,691,096
[45] Date of Patent: Nov. 25, 1997

[54] FLASH FUSIBLE TONER RESINS

[75] Inventors: Brian William Baird, Lee Way, Colo.; Art Fred Diaz, San Jose, Calif.; William Harve Dickstein, Morgan Hill, Calif.; Charles Mark Seymour, Gilroy, Calif.

[73] Assignee: Lexmark International, Inc., Lexington, Ky.

[21] Appl. No.: 333,524

[22] Filed: Apr. 4, 1989

[51] Int. Cl.$^6$ ........................................ G03G 9/087
[52] U.S. Cl. .................. 430/109; 430/110; 430/126; 430/136
[58] Field of Search .................... 430/109, 110, 430/126, 136

[56] References Cited

U.S. PATENT DOCUMENTS

| | | | |
|---|---|---|---|
| 3,998,747 | 12/1976 | Yamakami et al. | 430/106 |
| 4,229,512 | 10/1980 | Lenhard et al. | 430/42 |
| 4,416,965 | 11/1983 | Sandhu et al. | 430/109 |
| 4,634,649 | 1/1987 | Knapp et al. | 430/109 |
| 4,693,952 | 9/1987 | Koizumi et al. | 430/109 |
| 4,788,123 | 11/1988 | Berkes et al. | 430/126 |
| 4,908,290 | 3/1990 | Watanabe et al. | 430/109 X |
| 4,917,983 | 4/1990 | Uchida et al. | 430/109 |

FOREIGN PATENT DOCUMENTS

| | | | |
|---|---|---|---|
| 85303876.8 | 12/1985 | European Pat. Off. | |
| 87111758.6 | 3/1988 | European Pat. Off. | |
| 61-245166 | 10/1986 | Japan | 430/109 |
| 62-178278 | 8/1987 | Japan | 430/109 |

*Primary Examiner*—Marion E. McCamish
*Attorney, Agent, or Firm*—John A. Brady

[57] ABSTRACT

A toner particularly suited for flash fusing comprising a resin binder which is a bisphenol-A polyester containing an aliphatic diacid and sometimes also containing a hydroxyarenecarboxylic acid.

5 Claims, 1 Drawing Sheet

SYNTHESIS AND STRUCTURE OF BISPHENOL A POLYESTER
TONER RESINS x = 2,3,4

Preferred:

FLASH FUSIBLE TONER RESINS

TECHNICAL FIELD

The present invention is concerned with resins for use in toners, particularly flash fusible toners. The toners have the advantage of not producing harmful fumes or odors when flash fused.

BACKGROUND OF THE INVENTION

U.S. Pat. No. 4,416,965 and U.S. Pat. No. Re. 32,136 show toners having some structural similarity to those of the present invention. However, none has the unique combination of monomers which result in the superior properties attainable with the flash fusible toner resins described herein.

DISCLOSURE OF THE INVENTION

The present invention provides a new toner binder resin that is particularly suited to application in high speed flash fusing. It has high thermal stability, a low critical surface energy, and can be made in a variety of molecular weights, chain stiffnesses, and gel contents. A toner binder resin to be used in flash fusing should have the following characteristics:

1. Be capable of being synthesized via step-growth polymerization methods, so as to prevent depolymerization to dangerous monomers.
2. Have a glass transition temperature between 60–70 C.
3. Be totally amorphous and friable, to meet jet-milling requirements.
4. Be predominantly of low molecular weight polymer.
5. Be processable via melt processing in the presence of acidic charge control agents.
6. Be compatible with conductive dual component toner/carrier systems.
7. Have the appropriate rheological characteristics to allow for rapid fusing.
8. Be chargeable via tribocharging to form a stable charge that is stable in the presence of high humidity.
9. Be fusible via flash fusing to form a durable, well fused image.
10. Have low critical surface energy to facilitate and promote rapid spreading during fusing of toner on paper.

The present invention meets these requirements. Bisphenol A polyester (BAP) resins containing an aliphatic diacid and sometimes also a hydroxyarenecarboxylic acid of the type shown in FIG. 1 are used in flash fusible toner as the binder resin.

Figure 1:
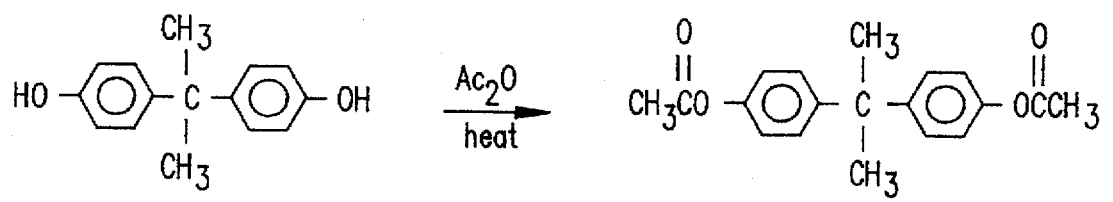
FIG. 1 is a schematic outline of the synthesis and structure of the compounds of the present invention. Bisphenol A is acetylated and the product reacted with an aliphatic diacid to yield copolymers, or with an aliphatic diacid and a hydroxyarenecarboxylic acid to yield a terpolymer. A partially crosslinked product is prepared when phloroglucinol is included as a monomer.
Figure 1:
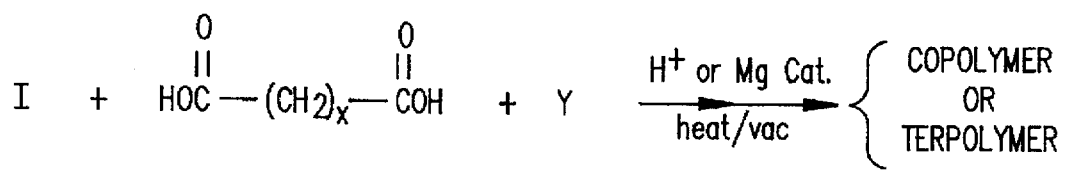
Figure 1:
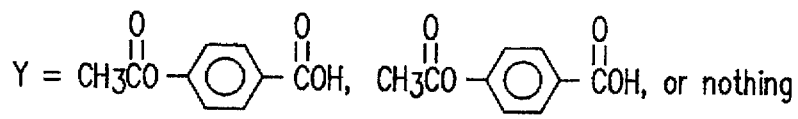
Figure 1:
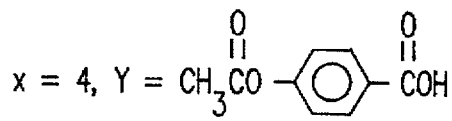

Polyesters using aliphatic dicarboxylic acids and bisphenol-A often have a low glass transition temperature. Low Tg in toner resin leads to toner filming on carrier and development hardware, and also causes blocking during storage or transport. This problem is solved by using hydroxybenzoic acid as a third monomer. Optimal glass transition temperature and melt viscosity are thus obtained without increasing molecular weight. This toner binder resin fulfills all of the above requirements. This class of material can be prepared readily using widely available inexpensive monomers. The preparation and structure of the resulting polymer is shown in FIG. 1. The superiority over the prior art in polyester toner resins is: (1) lower surface energy afforded by the use of an aliphatic dicarboxylic acid and the diol bisphenol, (2) the absence of toxic compounds generated during flash fusing, and (3) the ability to attain a controlled gel content level.

The critical surface energy as measured by contact angle for BAP is less than 40 dynes/cm which is lower than known styrene/acrylate resins. BAP resin has a 5% weight loss at 340° C. which compares to 260° C. for PICCO 1200 resin from Hercules. Furthermore, addition polymers will thermally depolymerize to regenerate the monomers. For example, the major degradation products using PICCO 1200 are styrene and n-butylmethacrylate, both of which are toxic, offensive smelling, and have a low flash point. The BAP materials decompose to form a char and very low level of volatile organics.

The polyester from bisphenol A and adipic acid with various third monomers have been prepared by solution and melt polymerization techniques in a number of different molecular weights. The glass transition temperature scales with the intrinsic viscosity which is related to molecular weight. A 10° C. increase in Tg is realized with the addition of 13% by mole of p-hydroxybenzoicacid as a third monomer. The polymers retain their glassy amorphous nature with the glass transition temperature of about 64° C. They can be milled, melt processed in the presence of acidic charge control agents, and tribocharged negatively on spherical and irregular carriers. This polymer is insensitive to moisture, and forms a durable fused image. Various polyester resins can be prepared by using different ratios of monomers to achieve different glass transition temperatures as required by the particular electrophotographic printer.

One novel technical advance over previous methods involves the use of bisphenol A monomer to favor the formation of a glassy amorphous polymer and the use of a nonstoichiometric monomer ratio to control both the molecular weight and end group chemistry, and the use of the third monomer to boost the Tg without raising the molecular weight which would in turn lower the friability and increase the melt viscosity. Also, end-group selectivity is possible in this system permitting the introduction of functionality to effect tribocharging. The use of aliphatic diacids lowers surface energy and the glass transition temperature. Since most polyesters are engineered to produce tough fracture resistant material, there has been little call to produce materials with low fracture energy and amorphous structure. These polymers, to our knowledge, represent a new approach to simultaneously engineering one polymer to meet the many requirements of a flash fusible toner.

Flash fusing presents certain peculiar challenges for a toner binder. This challenge is further increased by the cost consideration, milling rate requirements, and compounding requirements of the existing production facilities. The major difficulty in flash fusing is to obtain a temperature suitable for fusing at the paper/toner interface before the top layer of toner is heated above the temperature at which an unacceptable level of decomposition products are generated. The top layer of the toner is exposed to a much higher temperature than the required melt temperature. Thus there is a need for toner resin materials that melt and flow readily and have high thermal stability. Since spreading is a function of the surface energy of the toner and that of the paper, a further requirement is that the resin have a low critical surface energy. Prior art has used blends of polystyrene acrylate copolymers with heat stable epoxy resins to attain a compromise between thermal stability and low surface energy. Prior art involving BisphenolA copolymers also report the use of styrene/acrylate blends to obtain adequate performance. The low glass transition of the binary bisphenol-A polymers limits the usefulness in toner application. The present invention addresses all the key functional components of a flash fusing toner resin: low surface energy, Tg in the 60°–70° C. range, thermal stability with decomposition to nontoxic vapors, and tribocharging.

One preferred variation of the present invention leads to the ability to prepare BAP toner resins with controlled gel content. These nonlinear polyesters are prepared by the inclusion of 0.05 to 10 mol percent of the co-monomer 1,3,5-trihydroxybenzene to the preparation of the above mentioned linear polymer. Results on these partially gelled polyester resins indicate that the inclusion of 1,3,5-trihydroxybenzene into the BAP formula does not detract from the processability, low surface energy, and low volatiles release upon flash fusing which is characteristic of this resin family. In fact, the friability of the resins is improved as compared to the linear resins. Results show that toners prepared with resins containing gelled or crosslinked polymer are particularly resistant to filming onto the carrier in dual component developer systems, thus have much longer toner/carrier mix lifetime than toners with linear resin. Additionally, toners prepared from resins containing at least 25% gel content still attain optical densities upon flash fusing of 1.4. This high optical density is attainable with toner coverages of as little as 600 µg/cm$^2$.

What is claimed is:

1. The process of fusing toner to form a fused image comprising the step of flash fusing a flash fusible toner comprising a binder resin which is a bisphenol A polyester consisting of the reaction product of bisphenol A and an aliphatic diacid selected from the group consisting of succinic acid, glutaric acid and adipic acid with or without comonomers selected from the group consisting of hydroxyarenecarboxylic acid and 1,3,5-trihydroxybenzene.

2. The process as claimed in claim 1 in which said resin comprises a hydroxyarenecarboxylic acid as a comonomer.

3. The process as claimed in claim 1 wherein aliphatic diacid is adipic acid.

4. The process as in claim 1 in which said resin comprises p-hydroxybenzoic acid as a comonomer.

5. The process as claimed in claim 1 wherein said resin comprises from 0.05 to 10 mol percent of 1,3,5-trihydroxybenzene as a comonomer.

* * * * *